P. Manny.
Harvester Rake.
No. 16016. Patented Nov. 4, 1856.
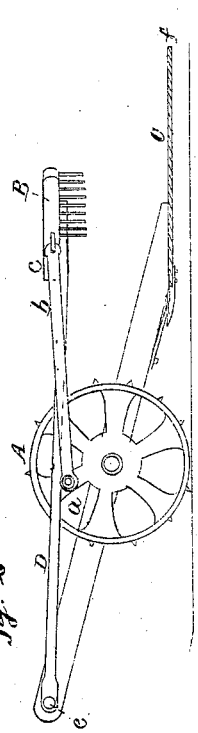
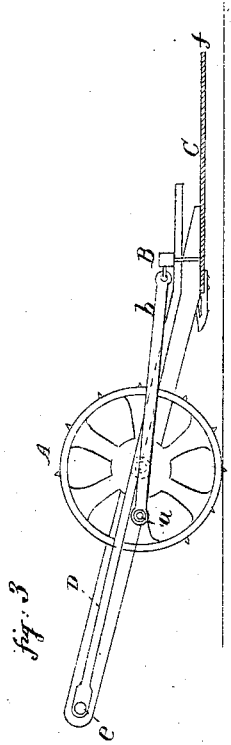
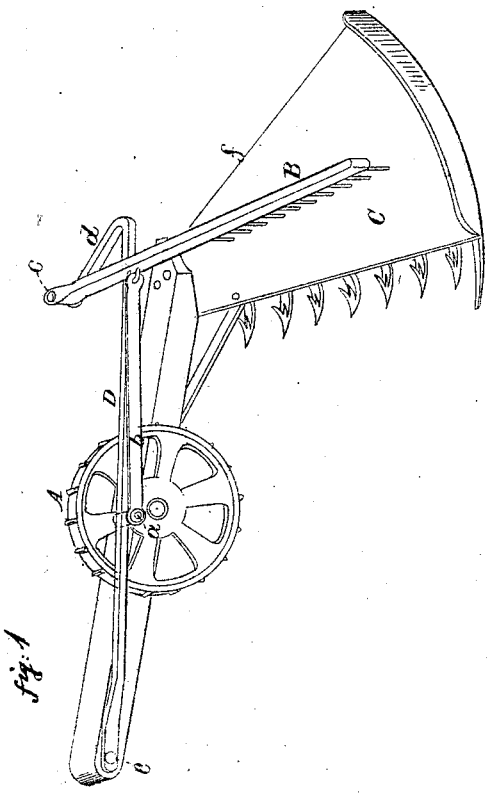

UNITED STATES PATENT OFFICE.

PELLS MANNY, OF WADDAM'S GROVE, ILLINOIS.

IMPROVEMENT IN AUTOMATIC RAKES FOR REAPERS.

Specification forming part of Letters Patent No. 16,016, dated November 4, 1856.

*To all whom it may concern:*

Be it known that I, PELLS MANNY, of Waddam's Grove, in the county of Stephenson and State of Illinois, have invented a certain new and useful Improvement in Automatic Rakes for Reapers, of which the following is a full, clear, and exact description, reference being had to the accompanying drawings, which form part of this specification, and in which—

Figure 1 represents a view in perspective of the rake with its driving appliances, and as applied to or working on or over the platform of a reaper; and Figs. 2 and 3, vertical views of the same, as seen from the one side of the reaper, and representing the rake in different working positions, the platform of the machine being shown in section.

My improvement has reference to that description of automatic rakes, as applied to reaping-machines, in which the rake, in raking off the grain from the platform, sweeps on or over the platform in a quartering direction from the front edge or cutting side of the platform backward toward the one side of the machine, and by this one motion rakes off the grain as it is cut at intervals from the machine, the rake rising after it has thus delivered the cut grain, and returning over the platform at a proper elevation from it, till arriving over the front edge of the platform, when the rake descends to resume its specified raking operation. This description of rake is essentially different from the "Atkins" rake, so called, both in the direction of its travel across the platform, its single instead of a double action for the delivery of the cut grain, the dispensing of a palm or hand to act in concert with the rake, the position of deposit of the cut grain in its relation to the travel of the machine, and in the totally different means which may be employd to operate the rake, as also it differs from another description of automatic rake which preceded the Atkins one. Many defects have characterized this description of rakes, which defects have been mainly owing to the means employed or mode of operating them. Simplicity of means is of course a desideratum, and many simple arrangements have been proposed; but most or all of them have been defective in giving that action to the rake throughout all its movements or operations which it should have, and which non-interference with the "reel" of the machine make it desirable it should have. Thus after having raked off the cut grain from the platform, instead of the rake rising more at its one end than the other—which has a retarding effect upon the cut grain, being discharged near the slowest and lowest rising end of the rake, and effects the discharge unequally; also, to admit of the lowest end of the rake being opened sufficiently wide to secure a moderate discharge there, requires the other end of the rake to be raised to an altitude that brings it in contact with the reel in the return-stroke of the rake, or else restricts the rake to a limited return-stroke terminating at too great a distance from the front edge of the platform—the rake should rise "square" throughout its length, so as to effect the discharge of the cut grain equally from the platform, and whereby no part of the rake need ascend so high as in its return-stroke to interfere with the projecting reel; but the rake being raised square and to an equal height throughout its length—which height need not much, if any, exceed the lowest point of the unequally-rising rake referred to—the rake may enter under the reel and rake the cut grain closer from the front edge of the platform. Also the rake-head, in swinging from its one end to produce a quartering raking action on the platform, should be balanced or supported intermediate of its length to give a firm action and prevent sagging of the rake at its unsupported end. A smooth or regular driving action to the rake throughout all its movement also is objectionable. Thus it should be violently or abruptly struck to detach the grain from the rake-teeth as the rake is about or commences to rise in effecting the delivery, and it should fall of its own weight, or with additional weight to give the rake-teeth sure, full, and easy entrance into the cut grain on the platform previously, or as it commences to rake off the grain from the platform. And, further, all these duties and movements of the rake, which usually have a varying alternately light and heavy effect upon the draft, should be so timed or arranged as to tax with equal effect, or nearly so, the driving-power, slightly "easing" before raking. All these and other advantageous or proper actions and practical requirements my improvement has in the highest degree, and the rake is made to effect its operations in the simplest and best possible manner, as will be evident from the following description, taken in connection with what already has been said.

In the accompanying drawings the rake is represented as driven by or from the main running-wheel of the machine, or "gear-wheel," as it is termed, which wheel is shown as arranged in advance of the platform; but of course this wheel may be differently situated; also, the rake may be driven from crank on the running-shaft of the machine, or from intermediate gear connected with it, or otherwise.

On the running-wheel A is a wrist-pin, $a$, to the outer extremity of which a connecting-rod, $b$, is attached, the other end of said rod being linked by a free joint to the rake B, at some point intermediate of its length, considerably in advance of the rear end of the rake. The rake, which is arranged, as described, for play over the platform C, is connected by a vertical joint-pin, $c$, at its rear end to a side arm, $d$, branching from a beam or lever, D, which is shown as running parallel, or thereabout, with the connecting-rod $b$, between said rod and the running or driving wheel, and which is fastened by a joint-pin, $e$, at its end farthest from the rake, to the frame of the machine, this joint of the beam admitting of up-and-down play to the beam, in manner of a hinge, and the beam, being so arranged in relation to the wrist-pin $a$ of the wheel as that, in the travel forward of the machine, the wrist-pin once during each revolution, for a short period, raises the beam by operating against it between its joint $e$ and the rake.

To illustrate the operation of the rake, then, suppose the parts to be in the position represented in Fig. 3, when the rake B is just beginning its raking operation from the front of the platform C, it will be perceived that as the driving-wheel A moves forward the rake will be swept over the platform in a quartering direction by means of the connecting-rod $b$, during, say, the one-half (more or less) of a revolution of the wrist-pin $a$, the lowest half, or mainly so, of said revolution, the rake thus making its horizontal or raking swing from the joint $c$ at its rear end as a center of motion. At the extremity of this action, when the rake is discharging the cut grain from the rear oblique edge, $f$, of the platform, the wrist-pin $a$ abruptly and violently, it may be said, strikes the under edge of the beam D, detaching any grain which might adhere to and clog or choke the rake, and, raising the beam D from its joint $e$ as a center of motion, lifts (as the wrist-pin continues its revolution,) the rake B up square, or at equal heights, as it were, throughout its length, from off the platform, by reason of its connection with and support on the beam, which is such as not to admit of or induce the rake's playing out of parallel relationship with or to the platform. The rake, it will be observed, is supported, in addition to its bearing at the joint $c$ on the side arm, $d$, on the lever or beam D itself, at a point some distance in advance of the rear end of the rake, and as the rear end, in the practical build of the rake, is usually the thickest and heaviest, the rake may in this way be said to be balanced when rising, and throughout its back-stroke, on the beam D, which prevents the rake sagging, &c. When the wrist-pin $a$ reaches its highest elevation, or thereabout, the rake has been raised to its greatest altitude by the lift of the beam D, and partly drawn back by the action of the connecting-rod $b$. After the wrist-pin $a$ passes its highest point, or thereabout, (which is the position represented in Figs. 1 and 2 of the drawings,) the wrist-pin ceases to act upon the beam, merely drawing back the rake by the connecting-rod $b$ till the arrival of the wrist-pin again at its position shown in Fig. 3, the beam D, during this period of travel, falling of its own weight, and the rake along with it, the rake still preserving parallel relationship with the platform, and in this manner (the rake not having been unduly lifted at one end, but the whole of it kept low and parallel) the rake may, without fear of striking the reel, enter in an easy curve by the combined actions of the beam and connecting-rod throughout its whole length, far under the reel or close to the cutting-edge of the platform to take up the cut grain lying there. The rake, in falling by its own weight and that of the beam D, which carries it, projects its teeth more forcibly and surely into the cut grain than if it were driven by the power of the wheel, and takes a better hold of the grain to rake it off the platform, the slight reciprocating movement of the rake, as the wrist-pin approaches and passes its advance center or dead-point, not interfering with the free fall of the rake into the grain, and the wrist-pin leaving the beam slightly behind or above it to fall freely as the rake-teeth feel the resistance of the cut grain in entering; or a crook may be made in the beam that will cause the wrist-pin to quit contact sooner with the beam to give it greater or freer fall. Should any hard foreign obstruction be thrown or get onto the platform, likely to damage the rake-teeth, the rake, in raking, will ride easily over it without injuring the teeth by the free rise which the jointed beam D gives to the rake or admits of its having. The driving-power, it will be observed, is relieved of the jerking action or strain which projecting the rake-teeth into the cut grain occasions, and is relieved of all severe strain, so far as the operation of the rake is concerned, immediately before the rake commences its work, which gives power, as it were, to begin the work, while the effort required to raise the rake and beam and return the rake corresponds, so far as it sensibly affects the draft, to the effort of raking, and in this way the draft is not irregularly taxed by the working of the rake, at least not perceptibly or sensibly so.

What I claim as my invention, and desire to secure by Letters Patent, is—

Pivoting the rake B, for curvilinear play over the platform, to the up-and-down-moving lever or supporting-beam D, and arranged to operate together and separately at intervals in relation to the platform and each other, in the manner and for the purposes set forth.

In testimony whereof I have hereunto subscribed my name.

P. MANNY.

Witnesses:
   J. F. CALLAN,
   A. GREGORY.